(12) United States Patent
Dyreby (10) Patent No.: US 8,273,157 B1
(45) Date of Patent: Sep. 25, 2012

(54) METHOD AND SYSTEM FOR AN INTEGRATED AIR FILTERING APPARATUS AND THERMAL SOLAR SYSTEM USING ASPECT RATIO

(75) Inventor: John James Dyreby, Berkeley, CA (US)

(73) Assignee: PVT Solar, Inc., Fremont, CA (US)

( * ) Notice: Subject to any disclaimer, the term of this patent is extended or adjusted under 35 U.S.C. 154(b) by 439 days.

(21) Appl. No.: 12/686,353

(22) Filed: Jan. 12, 2010

Related U.S. Application Data

(60) Provisional application No. 61/144,261, filed on Jan. 13, 2009.

(51) Int. Cl.
*B01D 45/00* (2006.01)
(52) U.S. Cl. ............................ 95/267; 55/434; 55/462
(58) Field of Classification Search ............ 95/267, 95/272; 55/434, 461, 462
See application file for complete search history.

(56) References Cited

U.S. PATENT DOCUMENTS 4,214,706 A * 7/1980 Gee et al. ............... 239/553.3
2006/0118163 A1 6/2006 Plaisted et al.

* cited by examiner

*Primary Examiner* — Robert A Hopkins
(74) *Attorney, Agent, or Firm* — Richard T. Ogawa; Ogawa P.C.

(57) ABSTRACT

A solar energy system. The system includes a thermal solar system comprising an air plenum positioned between the system and the underside body. In a specific embodiment, the air plenum is configured according to a specified aspect ratio. The system uses an air moving device to transfer a volume of air through the plenum. The air moving device is configured to maintain a flow rate associated with the volume of air at a specified velocity. The air plenum is configured to reduce the particle concentration of the air traveling through the plenum and to undergo heat treatment for use inside the target building where the thermal solar system is implemented, which keeps the air entering the building clean and healthy.

18 Claims, 11 Drawing Sheets a                    b

METHOD AND SYSTEM FOR AN INTEGRATED AIR FILTERING APPARATUS AND THERMAL SOLAR SYSTEM USING ASPECT RATIO

CROSS-REFERENCES TO RELATED APPLICATIONS

This application claims priority to U.S. Provisional Patent Application No. 61/144,261, filed on Jan. 13, 2009, commonly assigned and incorporated by reference for all purpose herein.

BACKGROUND OF THE INVENTION

The present invention relates to operation of a thermal solar system. More particularly, the present invention provides a method and system for filtering particles using a desired aspect ratio of a plenum configured in a thermal solar module or system. Merely, by way of example, the present invention has been applied to a thermal solar module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries worldwide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in the average temperature of the Earth's air near its surface, which is projected to continue to increase at a rapid pace. Warming is believed to be caused by greenhouse gases, which are derived, in part, from use of fossil fuels. The increase in temperature is expected to cause extreme weather conditions and a drastic size reduction of the polar ice caps, which in turn will lead to higher sea levels and an increase in the rate of warming. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

According to the present invention, techniques related to operation of a thermal solar system are provided. More particularly, the present invention provides a method and system for filtering particles using a desired aspect ratio of a plenum configured in a thermal solar module or system. Merely, by way of example, the present invention has been applied to a thermal solar module configured on a building structure, but it would be recognized that the invention has a much broader range of applications.

In a specific embodiment, the present invention provides an apparatus and method for air filtration ducts integrated into the underside of the thermal solar system. In one or more embodiments, the present air duct apparatus is formed by designs of rails, channels, struts, and other members having various designs and the like. In a specific embodiment, the air duct is disposed on the underside of the thermal solar system, which is affixed to a building structure such as a roof system or supported by a structural free standing ground frame or elevated frame. In a preferred embodiment, the present invention provides an air plenum between the thermal solar module and the underside body configured to a specified aspect ratio configured for efficient removal of particles from the air flow into the target location of the thermal solar system. The configured aspect ratio allows for the particle concentration of the air to be reduced through gravitational force as air flows through the thermal solar system from the open underside to clean up and filter the air through the air plenum according to a specific embodiment. Additionally in one or more embodiments, filtration structures and/or materials can be applied to the surface of the air plenum to increase the efficiency of particle reduction of the air. These filtration structures and/or materials can include structurally modifying the air plenum to have regular extensions or applying a filtration material to the surface of the plenum. Of course, there can be other variations, modifications, and alternatives.

As further information for background reading, solar components are often secured into a basic frame structure to form a solar module. The solar module is commonly made of a laminated structure including cover glass, photovoltaic window and absorber material, and electrodes, which are spatially disposed in a frame structure. As an example, a plurality of modules are spatially positioned and secured in a mounting frame in an array configuration arranged in rows and columns. The array is often secured to a building structure or other spatial location. The solar array often includes an aperture region and an underside opening, which is spatially open, elevated, and free from impediments or confinements to allow air, heat, and water to pass and flow under or around the components, modules or array elements. Further details of the solar module can be found throughout the present specification and more particularly below.

According to a specific embodiment, solar components can include one or more of the following:
1. Photovoltaic sheet(s) to create electricity energy from the sun;
2. Conductive thermal sheet(s) to collect thermal energy from the sun;
3. Cover glass and frame for securing the photovoltaic and conductive thermal sheet; and
4. Other components.

Of course, there can be other variations, modifications, and alternatives. As an example, modules serve one or more functions, including a solar function, a function maxillary to the solar functions, or a completely non-solar function for any type of purpose including but not necessarily limited to:
1. Solar electricity generating (photovoltaic) modules, panel, unit or assembly;
2. Solar thermal water heating, modules, panels, unit, or assembly;
3. Solar thermal air heating modules, panels, unit, or assembly;
4. Solar air conditioning, filtration, or dehumidification of air; and
5. Other types of auxiliary modules serving any other type of function of purpose, and alternatives now know or in the future.

Many benefits are achieved by way of the present invention over conventional techniques. For example, the present technique provides an additional function to an already integral component of the thermal solar system with the potential for performance-enhancing modifications. Additionally, the method provides a process that is compatible with the thermal solar system without substantial modifications to equipment and processes. Preferably, the invention provides for an efficient air filtration procedure integrated within the operation of the thermal solar system, which is less costly and easy to handle due to fewer individual stand-alone components to configure and maintain. Such a solar module system uses the air ducts disposed near the underside opening, which can be configured to a specific aspect ratio to maintain minimal particle concentration of the filtered air entering the target location of the solar module system according to a preferred embodiment. In a specific embodiment, the underside opening of the solar module system configured for improved air filtration using manually installed surface structures or materials can be used for catching airborne particles. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to operation of a thermal solar system are provided. More particularly, the present invention provides a method and system for filtering particles using a desired aspect ratio of a plenum configured in a thermal solar module or system. Merely, by way of example, the present invention has been applied to a thermal solar module configured on a building structure, but it would be recognized that the invention has a much broader range of applications.

Figure 1A:
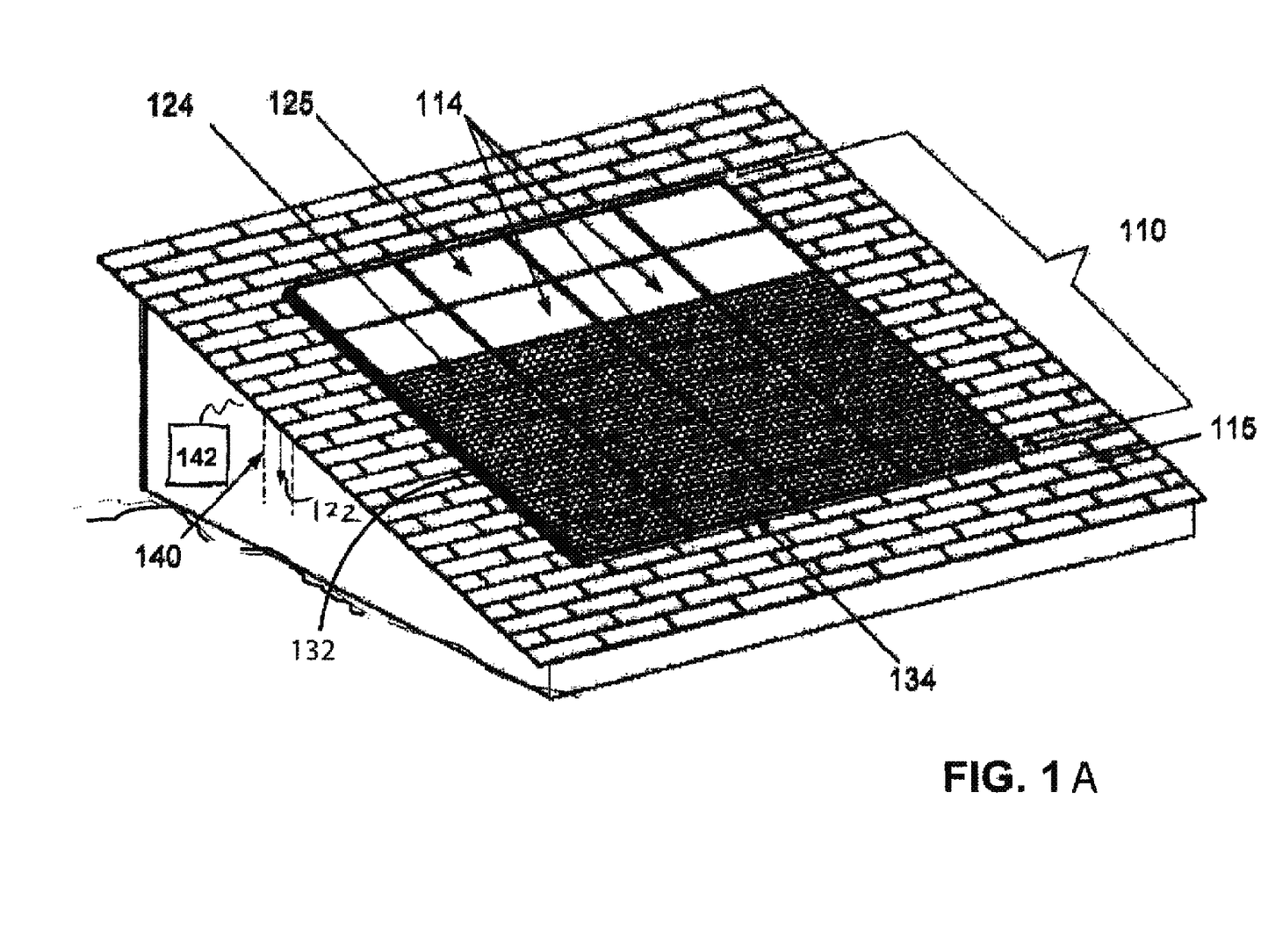
FIG. 1A is a simplified perspective view diagram of a thermal solar system according to an embodiment of the present invention.

FIG. 1A is a simplified perspective view diagram of a solar system according to an embodiment of the present invention. This diagram is merely an example, which should not unduly limit the scope of the claims herein. One of ordinary skill in the art would recognize other variations, modifications, and alternatives. As shown, the rack assembly 110, which is installed, that supports a set of solar modules 114 over an underlying body 115. The rack assembly 110 may be structured and adapted to include features such as described with one or more embodiments of the invention. The underlying body 115 may correspond to, for example, a rooftop or roof structure of a building or dwelling. In general, the underlying body 115 may correspond to any area, surface or platform that can receive sunlight and be connected to a building, place or location that can use the solar energy.

Figure 1B:
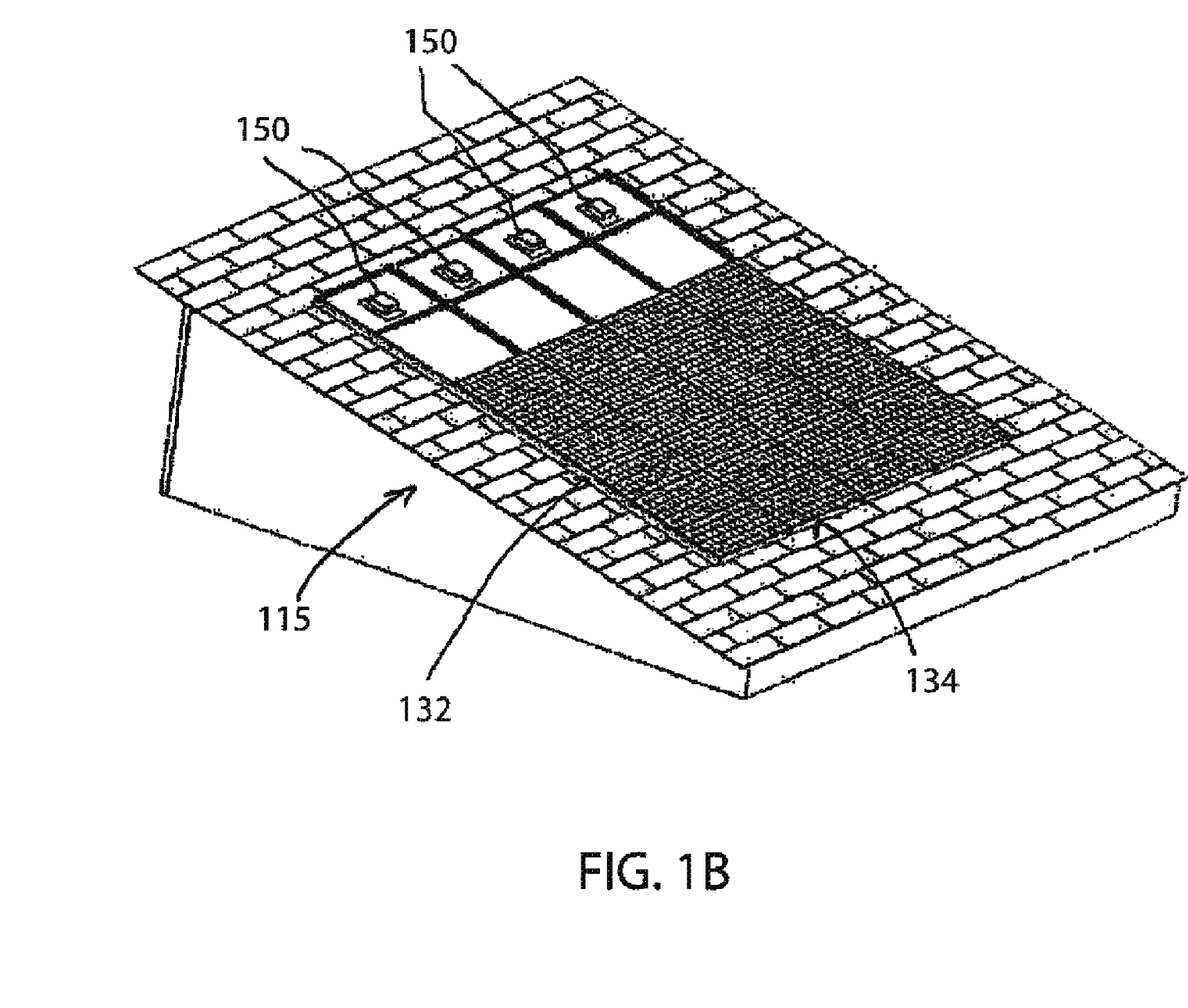
FIG. 1B is a simplified perspective view diagram of a thermal solar system according to an alternative embodiment of the present invention.

Embodiments of the invention contemplate that different types of solar modules 114 may be employed in various implementations and context. For example, as shown by the simplified diagram of FIG. 1B, the solar modules 114 include photovoltaic modules 124 and thermal modules 125. Under one or more embodiments, the perimeter may include one or more sealed lengths 132 and an open length 134 from which air from the environment is drawn. As will be described, channels (not shown) may be provided between the rack assembly 110 and underlying body 115 for purpose of constraining airflow. Air drivers (not show) may drive (e.g. push or pull) air within the formed channels. The solar modules 114 generate heat, either through design or as an inherent by-product. According to one or more embodiments, this heat warms the air as it is drawn from the environment and pulled through the channels formed underneath the solar modules 114.

Various alternatives and variations are contemplated. For example, all of the perimeter of the rack assembly 110 may be sealed, and air may be drawn from within a dwelling on which the rack assembly 110 is provided. This air may be pushed through channels, then back into the dwelling when warmed. Alternatively, some or all of the open length 134 may be sealed, or conversely, portions of the sealed lengths 132 may be opened or perforated as part of an underlying channel system. As shown, FIG. 1A illustrates an implementation in which heated air is directed into a duct 140 within a structure of the underlying body 115. For example, warm air may heat a dwelling on which the rack assembly 110 is installed, and the duct 140 enables the heated air to flow into the circulation system of the dwelling. As mentioned, the solar modules 114 may be formed by a combination of the photovoltaic modules 124 and the thermal modules 125. The photovoltaic modules 124 can generate some residual heat when receiving solar energy and converting the solar energy into electrical current. In contrast, the thermal modules 125 may directly convert the solar energy into heat at a higher efficiency. The use and number of thermal modules 125 may depend on the use of the heated airflow, as well as the environment where the rack assembly 110 is installed. For example, when the purpose of heating air in the channels is to supply warm air to a dwelling of the underlying body 115, the thermal modules 125 have more use in colder environments, while warm environments may require only use of photovoltaic modules 124. Even in cold environments, thermal modules 125 may be used to convert solar energy into hot air due to the high operating efficiency achieved by their designs, and additional components may be used to drive the hot air into the dwelling.

Referring again to FIG. 1B, multiple ventilation outlets 150 may be employed for directing heated air from under the rack assembly. As such, the ventilation outlets are located underneath the thermal modules 125. As shown with FIG. 1A, the open length 134 of the perimeter is provided on one side, and the series of vents 150 are provided lengthwise on the other side of the perimeter formed by the rack assembly 110. For example, the vents 150 may guide the directed heated air inward into the structure of the underlying body 115. Of course, there can be other variations, modifications, and alternatives. As merely an example, further details of the rack assembly can be found in United States Patent Application Publication 20060118163 A1 in the names of Joshua Reed Plaisted et al., commonly assigned, and hereby incorporated by reference herein. Of course, there can be other variations, modifications, and alternatives. Further details of the shaped structure underlying the solar array are described throughout the present specification and more particularly below.

Figure 1C:
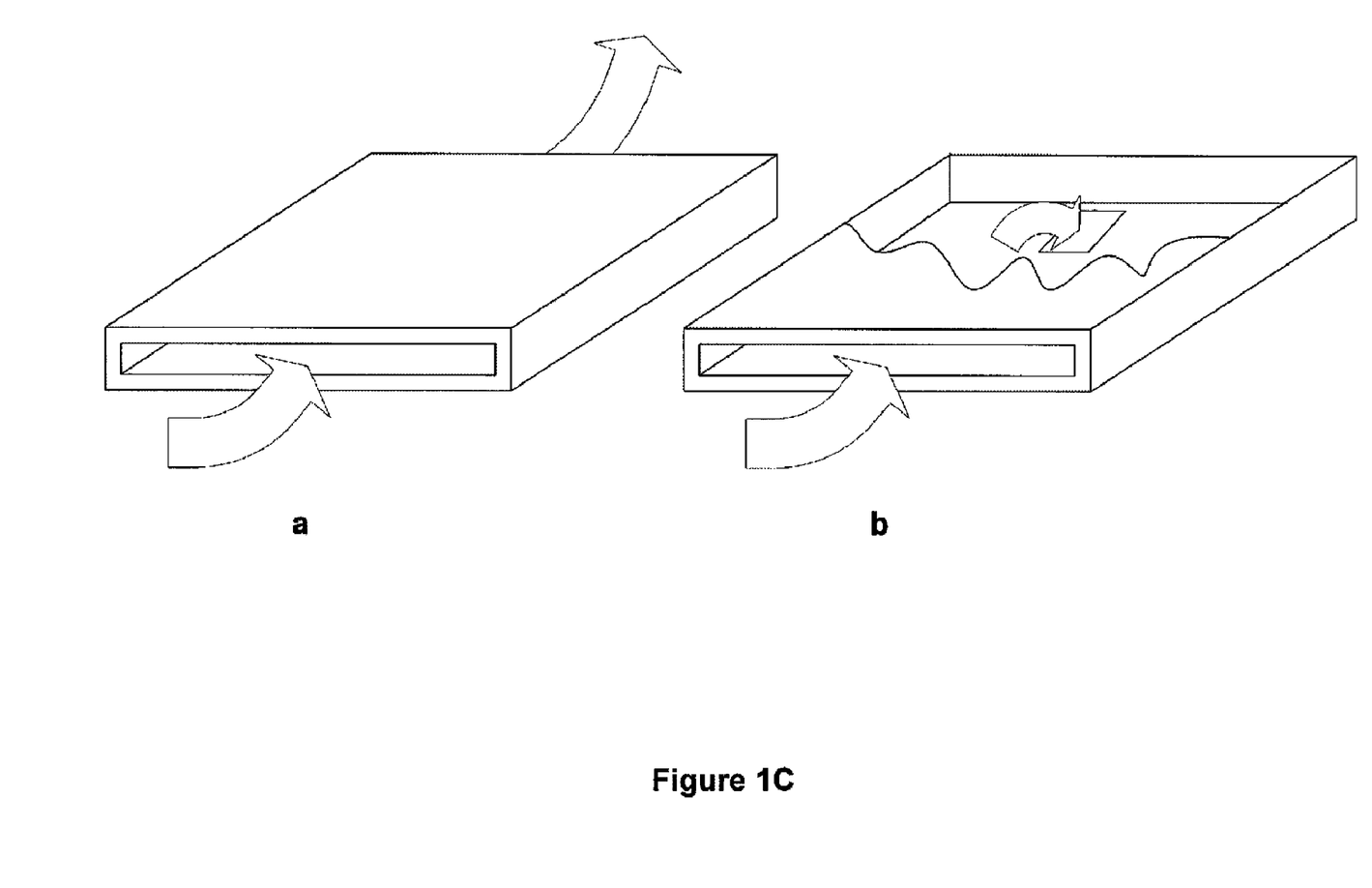
FIG. 1C is a simplified diagram of an air plenum structure having an aspect ratio according to an embodiment of the present invention.

FIG. 1C is a simplified diagram of an air plenum structure having an aspect ratio according to an embodiment of the present invention. This diagram is merely an example, which should not unduly limit the scope of the claims herein. One of ordinary skill in the art would recognize other variations, alternatives, and modifications. As shown, the present air duct apparatus 180 is formed by designs of rails, channels, struts, and other members having various designs and the like. In a specific embodiment, the air duct is disposed on the underside 182 of the thermal solar system 170, which is affixed to a target location 190, such as a roof system, or supported by a structural free standing ground frame or elevated frame, and the like. In a specific embodiment, the air duct apparatus or air plenum 180 is characterized by an aspect ratio (L/W) of at least 5:1 and having a length of greater than 100 inches. The aspect ratio can also be 10:1 or 15:1 and greater depending upon the embodiment. In a specific embodiment, the specified aspect ratio provides the basic functionality of reducing the particle concentration 188 of the air 196 passing through the plenum by gravitational force, shear lift, turbophoresis (the tendency for particles to migrate from more turbulent to less turbulent regions), and inertial impact, as well as combinations of these mechanisms.

In a specific embodiment, the plenum has one or more intake regions 184 and one or more exhaust regions 186. The intake region and the exhaust region can be configured in an angled orientation relative to gravity. Also, the intake region 184 can have a first height relative to a ground and the exhaust region 186 can have a second height relative to a ground, the first height being less than the second height. In a specific embodiment, the one or more intake regions 184 can be configured near a lower portion of the solar module array, although there can be other spatial locations. Additionally, the one or more exhaust regions 186 can be a single exhaust region or multiple exhaust regions disposed spatially in a configuration near an upper portion of the solar module array 170. Of course, there can be other variations, modifications, and alternatives.

For the proper use of the air plenum 180, an air moving device or drive device can be used to maintain an air flow 196 rate from the underside opening 182, according to an embodiment of the present invention. The drive device includes an electric motor with high temperature windings, which can withstand about 165 Degrees Fahrenheit and is operable at a range from about 400 RPM to 4000 RPM, but can be others. In a specific embodiment, the aspect ratio described herein allows for particles to settle along the path of the air plenum a spatial distance between one or more intake regions and one or more exhaust regions. Particles 188 having a size ranging from about 0.1 micron to about 400 microns will tend to settle along the path between the intake 184 and exhaust 186 regions without additional complicated modifications to the plenum 180. According to a specific embodiment, the particles 188 will tend to accumulate on the surface of the air plenum 180 a spatial distance between the intake 184 and exhaust 186 regions due to the aspect ratio providing an optimal configuration for gravitational pull to reduce the particle concentration 188 effectively. Additionally, the aspect ratio provides an optimal configuration for the rails, channels, struts, and other members to filter the particles through a combination of turbophoresis and inertial impact effects, among others. In another specific embodiment, the aspect ratio of the air plenum L/W can be increased to 10:1 or 15:1, or any such variation that can be used to reduce the particle concentration 188 of the air flow 196. Having an aspect ratio of 5:1 increases the amount of surface area the air passes over and around, which increases the probability a particle in the air will make contact with the surface, either through gravitational forces, inertial impact, or turbophoresis. Typically, once a particle has impacted a surface it adheres, and does not tend to re-enter the airstream. Increasing the aspect ratio to 10:1 or 15:1 serves to increase the amount of surface area 'seen' by the air stream.

Additionally in one or more embodiments, filtration structures and/or materials 194 can be applied to the surface of the air plenum to increase the efficiency of particle reduction of the air. These filtration structures and/or materials 194 can include structurally modifying the air plenum 180 to have regular extensions or applying a filtration material 194 to the surface of the plenum 180. In one or more embodiments, these extensions would serve to increase the effect of turbophoresis by creating regions of high and low turbulence. Additionally, these extensions could serve as obstacles in the path of the air stream that would cause particles to impact and adhere due to inertial effects. Likewise, the filtration material would increase the surface area particles could adhere to. Of course, there can be other variations, modifications, and alternatives.

Many benefits are achieved by way of the present invention over conventional techniques. For example, the present technique provides an additional function to an already integral component of the thermal solar system 170 with the potential for performance-enhancing modifications. Additionally, the method provides a process that is compatible with the thermal solar system 170 without substantial modifications to equipment and processes. Preferably, the invention provides for an efficient air filtration procedure integrated within the operation of the thermal solar system 170, which is less costly and easy to handle due to fewer individual stand-alone components to configure and maintain. Such a solar module system 170 uses the air ducts or air plenum 180 disposed near the underside opening 182, which can be configured to a specific aspect ratio to maintain minimal particle concentration of the filtered air entering the target location 190 of the solar module system 170 according to a preferred embodiment. In a specific embodiment, the underside opening 182 of the solar module system configured for improved air filtration using manually installed surface structures or materials 194 can be used for catching airborne particles. The benefits of the present invention include those previously described, but those skilled in the art will recognize other variations, modifications, and alternatives that can provide additional possible benefits.

Figure 1D:
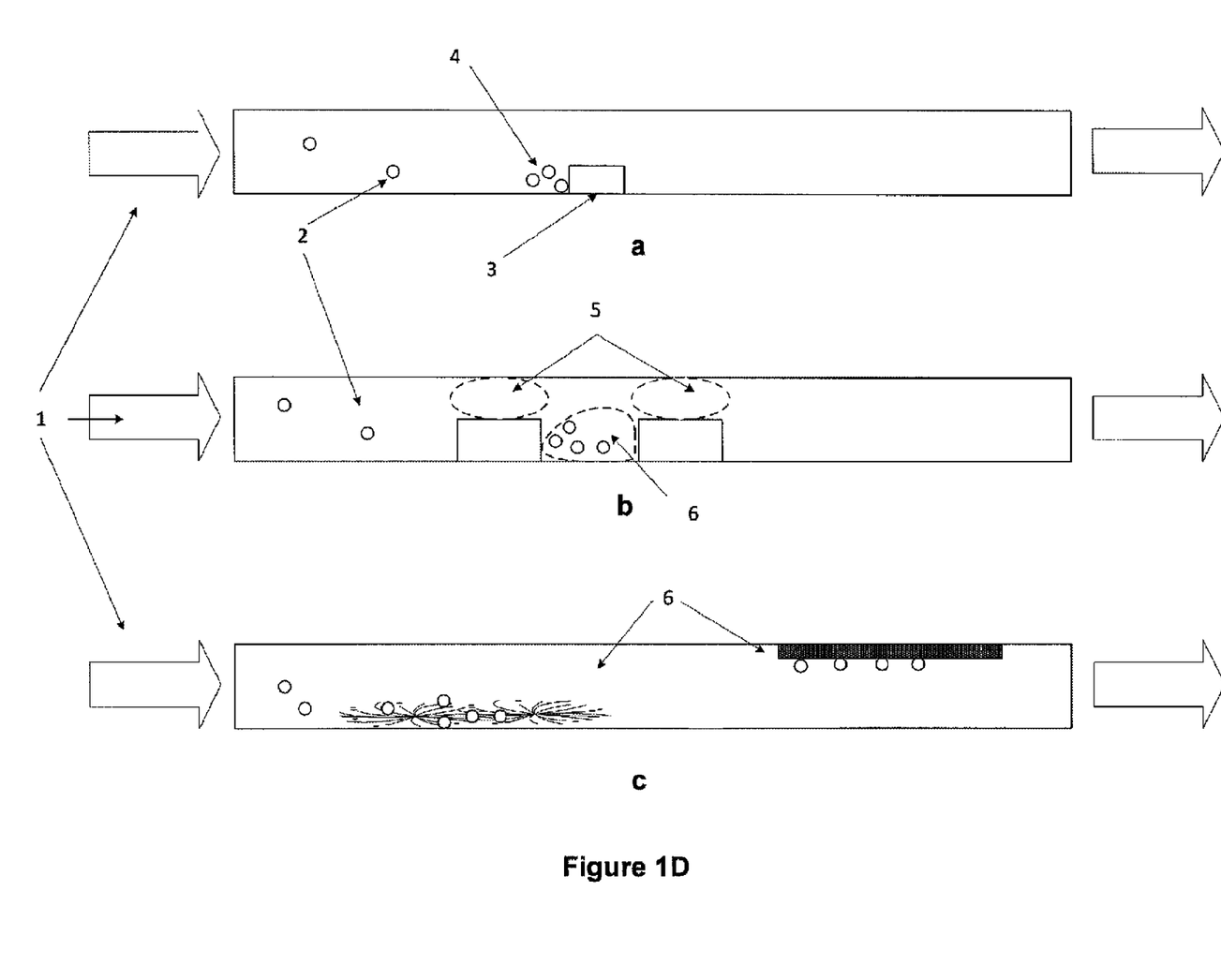
FIG. 1D is a simplified diagram of one or more air plenum structures according to embodiments of the present invention.

FIG. 1D is a simplified diagram of one or more air plenum structures according to embodiments of the present invention. This diagram is merely an illustration, which should not unduly limit the scope of the claims herein. One of ordinary skill in the art would recognize other variations, modifications, and alternatives. As shown in the three embodiments, air enters 1 with a high particle concentration 2. In the case of FIG. 1Da, a combination of gravity and inertial impact effects cause the particles to strike the surface of the plenum and the impediment 3 and remain within the filter 4. In the case of FIG. 1Db, impediments cause the air to experience high 5 and low 6 turbulence regions. Turbophoresis occurs and the particles become trapped in the low turbulence region 6. In the case of FIG. 1Dc, material such as traditional filter fiberglass matted (or similar) material or an adhesive material 6 is affixed to the high aspect plenum surface, thereby removing particles from the airflow. Each of these filtering devices could be used together or in any combination with themselves or other techniques. The high aspect ratio of the intake plenum serves to heighten the effects of each of these mechanisms be increasing the surface area over which the air flows and maximizing exposure to the filtering mechanisms. Of course, there can be other variations, modifications, and alternatives.

Figure 2:
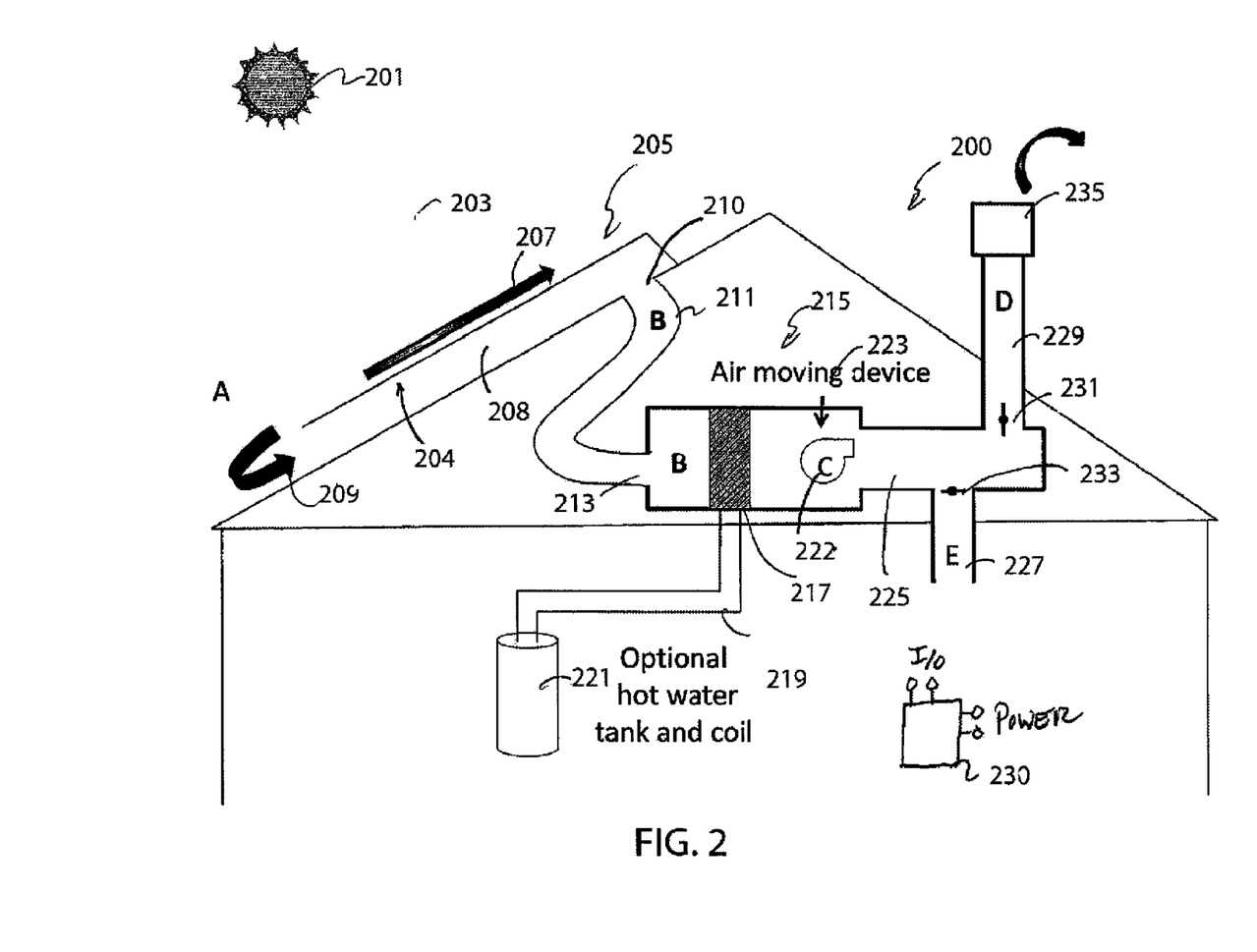
FIG. 2 is a simplified diagram of a thermal solar system implemented at a target location according to an embodiment of the present invention.

FIG. 2 is a simplified diagram of a thermal solar system implemented at a target location according to an embodiment of the present invention. This diagram is merely an example, which should not unduly limit the scope of the claims herein. One of ordinary skill in the art would recognize other variations, modifications, and alternatives. As shown, the thermal solar system 200 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules is configured to form an aperture region 205 and a backside region 204. In one or more embodiments, the thermal solar modules can be combined with photovoltaic modules or solely thermal modules or photovoltaic modules configured for thermal use to provide a heat source. Of course, there can be other variations, modifications, and alternatives.

In a specific embodiment, electromagnetic radiation 203 from the sun or other radiation source illuminates on the aperture region. In one or more embodiments, thermal energy is transferred through the solar module and applies the thermal energy to a working fluid 209 such as air, which traverses 207 in an upward direction through an air plenum 208 configured from at least the backside region. In a specific embodiment, the air plenum has one or more intake regions and one or more exhaust regions 210. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array. Of course, there can be other variations, modifications, and alternatives.

In a specific embodiment, the present system includes a shaped structure or thickness of material coupled to the backside region to form the plenum. In a specific embodiment, the shaped structure is integrally configured with the rack structure or disposed underlying the various components of the solar module or thermal array. In a specific embodiment, the shaped structure or thickness of material can be the pan structure coupled to the backside region. In a preferred embodiment, the shaped structure has a suitable thickness to prevent moisture from penetrating into the plenum region, but can also be vented according to one or more embodiments. Of course, there can be other variations, modifications, and alternatives.

Referring again to FIG. 2, the system has a first duct 210 coupled to the one or more exhaust regions 210. In a specific embodiment, the first duct can couple into a fluid flow region 215 having a fluid flow intake region 213 coupled to the first duct region, a fluid flow exit region 225, and an fluid drive region 223 spatially disposed between the fluid flow intake region and the fluid flow exit region. As used herein, the terms "fluid exit region" "fluid flow intake region" "fluid drive region" and others are not intended to be limiting and should be interpreted by ordinary meaning. Also shown are valves or dampers 231 233 which respectively connect to air pathways 229 and 233 to an outside region via exhaust 235 or back into a building structure via exhaust 227. Of course, there can be other variations, modifications, and alternatives.

In a specific embodiment, the system has an air moving device 222 comprising a drive device coupled to a blower device. In a preferred embodiment, the drive device is spatially disposed within the fluid drive region. In a specific embodiment, the drive device comprises an electric motor. That is, the drive device comprises an electric motor with high temperature windings, which can withstand about 165 Degrees F. As merely an example, the electric motor is a Class F and greater under the trade association for the association of electrical and medical imaging equipment manufacturers, commonly called "NEMA." In a specific embodiment, the drive device is operable at a range from about 400 RPM to 4000 RPM, but can be others. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 200 Degrees Fahrenheit based upon the temperature insulation rating of the drive device, which is spatially disposed within the air flow region.

In a specific embodiment, the system has one or more sensing device coupled to the controller device. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. Of course, there are other variations, modifications, and alternatives.

In a specific embodiment, the system also has a controller 230 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. Of course, there can be other variations, modifications, and alternatives.

Referring again to FIG. 2, the system has a second duct 225 coupled to the fluid flow exit region. As shown, the system can also include a heat exchanger 217 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 219, which preheats water for the hot water tank 221 or other heating apparatus. Further details of the present system and related methods can be found throughout the present specification and more particularly below. A detailed description of the controller and thermal solar module are described more particularly below.

Figure 3:
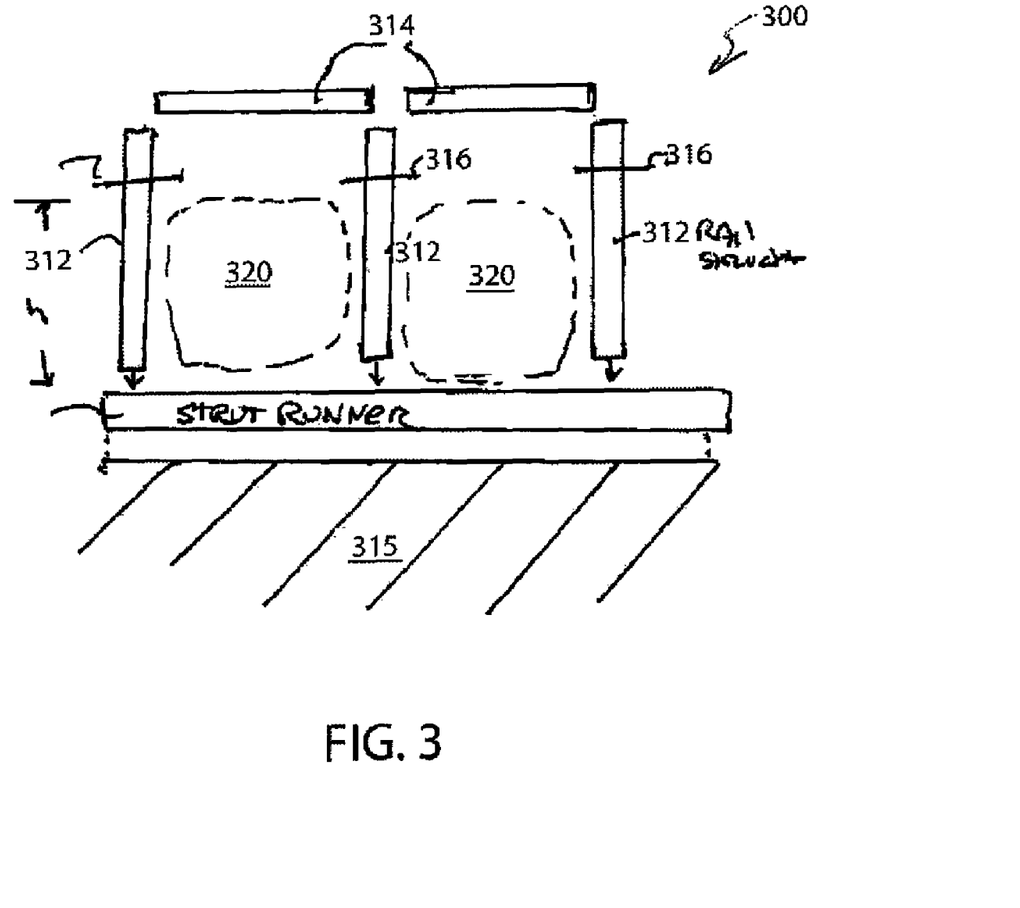
FIG. 3 is a simplified side view diagram of a rack assembly for a solar system according to an embodiment of the present invention.

FIG. 3 is a simplified side view diagram of a rack assembly for a solar system according to an embodiment of the present invention. This diagram is merely an example, which should not unduly limit the scope of the claims herein. One of ordinary skill in the art would recognize other variations, modifications, and alternatives. As shown, the rack assembly is form supporting solar modules, under one or more embodiments of the invention. In a specific embodiment, the rack assembly 310 includes a plurality of rail structures 312 that provide support for individual solar modules 314. When installed, the rail structures 312 support the individual solar modules 314 a given height h above an underlying body 315. The underlying body 315 may correspond to any surface, platform or structure on which solar modules 314 are mounted. For example, underlying body 315 may correspond to a rooftop of a commercial or residential building or other suitable structure. The solar modules 314 may correspond to photovoltaic solar cells that convert solar energy into electricity, or alternatively, solar heating modules which directly generate heat using solar energy. Alternatively, the solar cells can be a combination of photovoltaic and thermal modules according to one or more embodiments.

According to one or more embodiments, the rail structures 312 are adjustable pair-wise, or in other combinations, in order to hold in place solar modules 314 of various dimensions and sizes. In one or more embodiments, the solar modules 314 are supported by a combination of retention structures 316. Each retention structure 316 may be provided with a corresponding one of the rail structures 312. In one or more embodiments, each retention structure 316 is a structural feature of the corresponding rail structure 312. For example, each rail structure 312 may comprise of multiple interconnected segments, and the retention structure(s) may be one of the interconnected elements. Alternatively, the retention structures 316 may be integrated or unitarily formed with the individual rail structures 312. Each retention structure 316 supports individual solar modules 314 by grasping edge segments. In one or more embodiments, the retention structures 316 and/or rail structures 312 are adjustable to grasp and support solar modules 314 of varying thicknesses and forms.

Referring again to FIG. 3, an embodiment provides that rail structures 312 are mounted indirectly to the underlying body 315 through use of a set of strut runners 318. Each strut runner 318 mounts to the underlying body 315 and to multiple rail structures 312, thus, providing lateral support to maintaining the rail structures 312 upright, while at the same time providing a buffer between the individual rail structures 312 and the underlying body 315. The rail structures 312 may mount to the strut runners 318, and the strut runners may mount to the underlying body 315.

According to an embodiment, the rack assembly 310 forms a portion of a solar heat exchange system that uses heat generated from the solar modules 314 for any one of various useful purposes. The heat exchange may be enabled by the formation of one or more channels 320 between an underside of solar modules 314 and the underlying body 315. An individual channel 320 may be defined in part by one or more of the rail structures 312, as well as the underlying body and possibly the underside of the solar modules 314. The individual channel 320 may occupy at least a portion of the thickness defined by the height. The solar heat exchange system may further include other components, such as a plurality of thermal panels, as well as air directors that draw air into the channel 320, and/or push the air through the channel. When installed as part of a solar heat exchange system, the rack assembly 310 may be positioned to supply heated air to such air directors, and to be proximate to the environment that is to receive or use the heated air. For example, the rack assembly 310 may be installed on the rooftop of a dwelling, and also direct heated air into a vent or air circulation system of the dwelling as part of its ability to heat air in the channel 320. Useful purposes for generating heat from the solar modules 314 may include, for example, any one or more of the following: (i) cooling the individual solar modules 314 (when photovoltaic) so as to make them more efficient, (ii) pulling air from the environment underneath the solar modules 314 for purpose of heating the air for another closed environment or system (e.g., for a house), and (iii) circulating air from the closed environment or system underneath the solar modules 314 to heat that air and use it for heat. Of course, there can be other variations, modifications, and alternatives.

Figure 4:
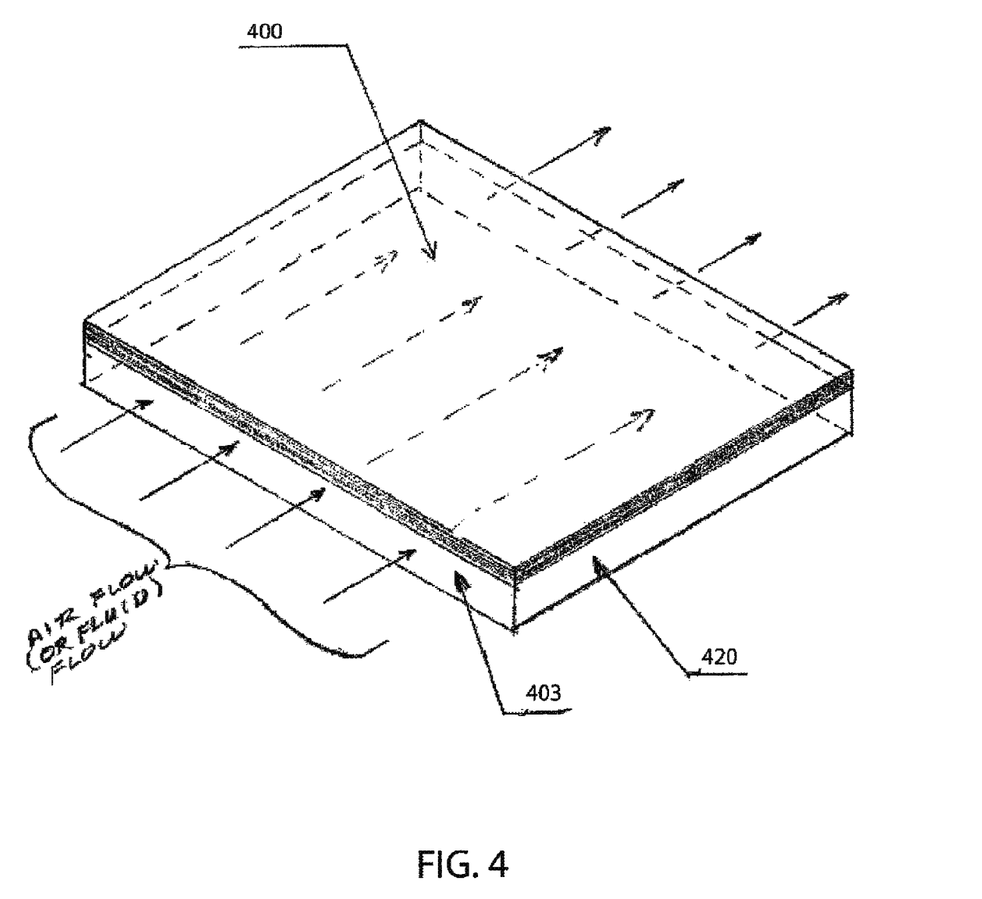
FIG. 4 is a simplified diagram of a pan structure for a thermal solar system according to an embodiment of the present invention.

FIG. 4 is a simplified diagram of a back plate structure 400 for a thermal solar system according to an embodiment of the present invention. This diagram is merely an example, which should not unduly limit the scope of the claims herein. One of ordinary skill in the art would recognize other variations, modifications, and alternatives. As shown is a rigid insulating structure, which couples to a backside of the solar array according to a specific embodiment. In a specific embodiment, the rigid insulating structure is preferably a shaped thickness of material 400 having a first side and a second side. In a preferred embodiment, the shaped thickness of material is characterized by a fire rating of at least A, but can be others. The material has a thickness suitable to be free from penetration of moisture according to one or more embodiments. Of course, there can be other variations, modifications, and alternatives.

The thickness of material also has a structural characteristic capable of maintaining a shape and coupling to the backside region of the thermal solar module according to one or more embodiments. In a specific embodiment, the shaped thickness of material or shaped structure includes sidewall regions 420, which face parallel to each other, and intake and exhaust regions 403, which also face parallel to each other. In a preferred embodiment, the shaped thickness of material or shaped structure can be a single continuous member or be one of a plurality of like structures that are coupled to each other to form a larger shaped structure, which is integral to the rack and solar module array. Further details of the larger shaped structure can be found throughout the present specification and more particularly below.

Figure 5:
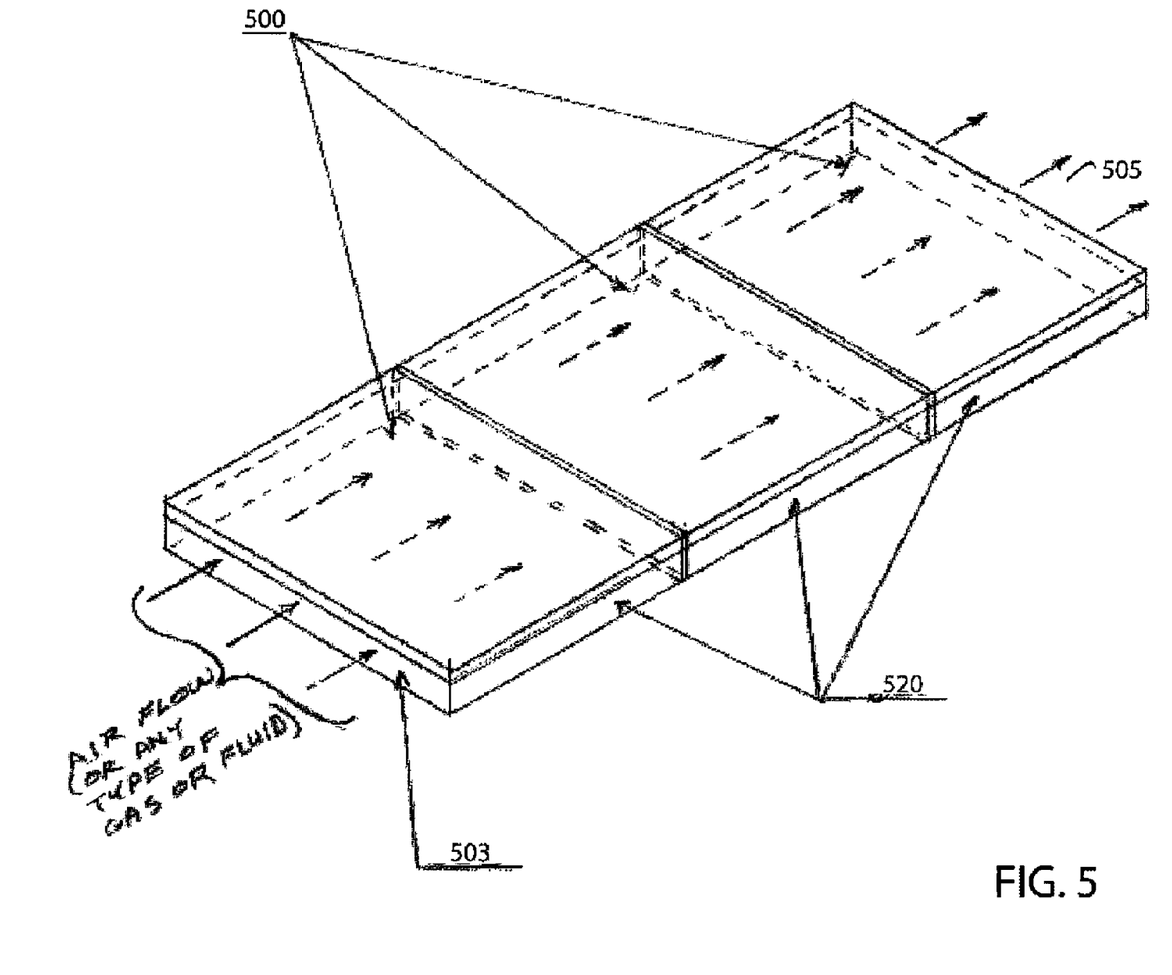
FIG. 5 is a simplified diagram of a pan structure for a thermal solar system according to an alternative embodiment of the present invention.

FIG. 5 is a simplified diagram of a back plate structure 500 for a thermal solar system according to an alternative embodiment of the present invention. This diagram is merely an example, which should not unduly limit the scope of the claims herein. One of ordinary skill in the art would recognize other variations, modifications, and alternatives. As shown, each of the segments 520 operably coupled to each other to form an integrated shaped structure extending from an intake region 503 to an exhaust region 505. In a specific embodiment, the integrated shaped structure operably couples to the rack and solar module array. In a preferred embodiment, each of the segments is manufactured separately and installed either on the roof or on the ground. Each of the segments includes a border region for structural support according to a specific embodiment. Again, there can be other variations, modifications, and alternatives.

Figure 6:
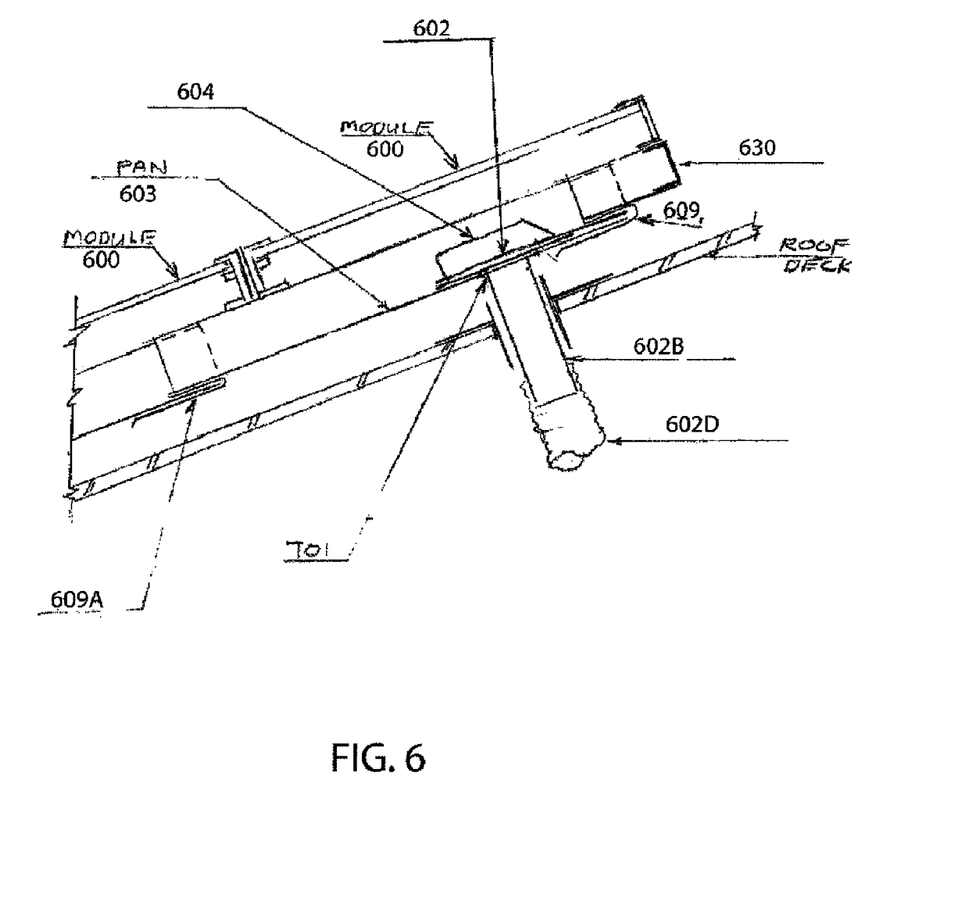
FIG. 6 is a simplified diagram of side view cutaway of a solar module and pan structure according to an embodiment of the present invention.

FIG. 6 is a simplified diagram of side view cutaway of a solar module and back plate pan structure according to an embodiment of the present invention. This diagram is merely an example, which should not unduly limit the scope of the claims herein. One of ordinary skill in the art would recognize other variations, modifications, and alternatives. As shown, the cutaway includes modules 600 with under pan 603 structure according to an embodiment of the present invention. In a specific embodiment, an opening is formed or cut through the pan 601 and the air take-off assemble 602 is inserted through that opening, as shown. In a specific embodiment, the cutaway illustrates an air take off duct 602D attached to the air take off 602B, which can be a single duct or multiple duct assemblies according other embodiments. In a specific embodiment, the cut away also includes a protective water flashing assembly, which laps or covers the air take-off assembly. Depending upon the embodiment, a plurality of openings and respective ducts can also be configured on a lower region of the pan structure. Of course, there can be other variations, modifications, and alternatives.

In a specific embodiment, an upper edge of a water protective flashing is inserted into the "S" seam as located above a special region shown by reference numeral 609. In a specific embodiment, the top of the pan air stop or "air-cap" 630 is attached to the top of the pan assembly to seal the end portion of the pan assembly. In a specific embodiment, the pan assembly includes a plurality of pan structures, which couple to each other using an "S" seam 609A or can be another suitable attachment device. Also shown is the building structure or roof according to a specific embodiment. Of course, there can be other variations, modifications, and alternatives.

Figure 7:
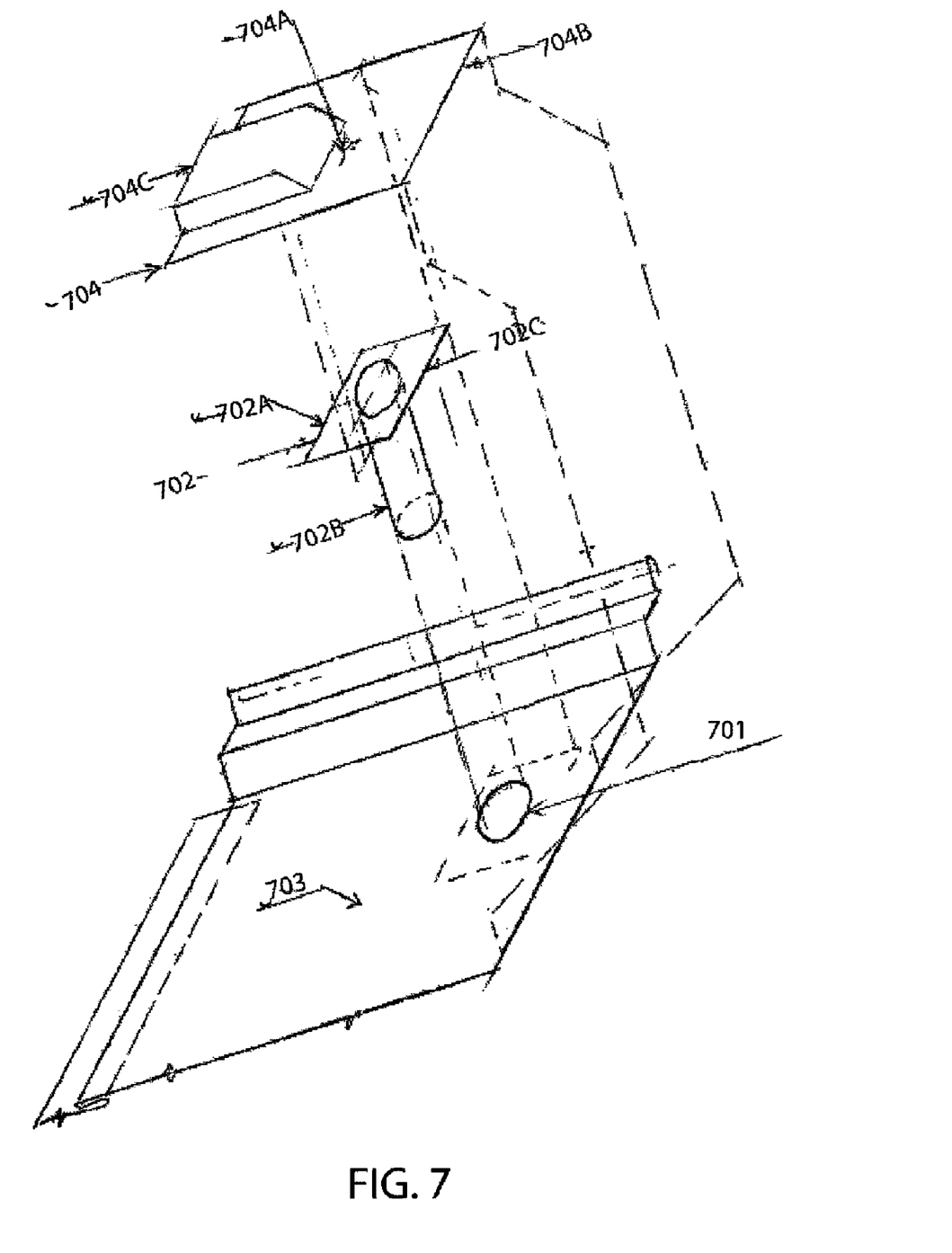
FIG. 7 is a simplified assembly diagram of a pan structure and associated ducting according to an embodiment of the present invention.

FIG. 7 is a simplified assembly diagram of a pan structure and associated ducting according to an embodiment of the present invention. This diagram is merely an example, which should not unduly limit the scope of the claims herein. One of ordinary skill in the art would recognize other variations, modifications, and alternatives. As shown, the assembly diagram illustrates alignment and installation of one or more elements including an air take-off pan, protective water flashing, among other features. In a specific embodiment, the assembly diagram includes an opening or hole cut 701 within a pan structure. In a specific embodiment, the hole cut in the pan provides an opening for air takeoff duct to pass through, although there can be other uses. As also shown is an air take off assembly 702, which includes flashing skirt 702A, air takeoff duct 702B, top edge of flashing skirt 702C, among other features. In a specific embodiment, the pan includes a portion 703 of the under pan structure. Of course, there can be other variations, modifications, and alternatives.

In a specific embodiment, the protective water flashing assembly 704 for an upper edge of air take off is also illustrated. The assembly includes an upper edge of protective flashing 704B, which is aligned with the top edge of the pan structure according to a specific embodiment. The assembly also has a lower edge of protective flashing 704A, which laps over the top of the air take-off plate according to a specific embodiment. Also shown is an air intake flashing 704C, which covers the air take off assembly. Further details of alternative pan structures in side-view diagrams are illustrated below.

Figure 8:
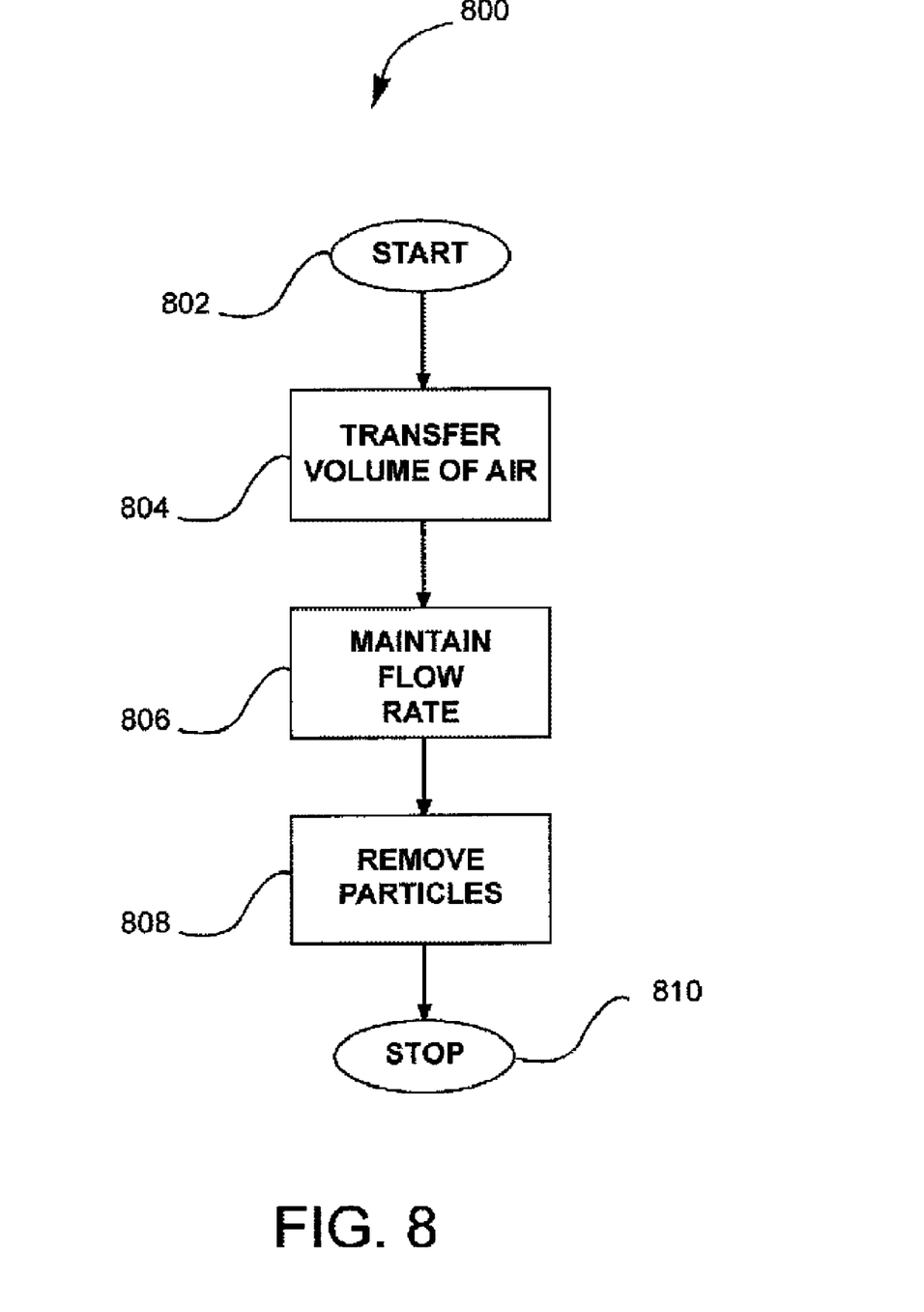
FIG. 8 is a simplified flow diagram illustrating a method of removing particles from a volume of air through the thermal solar system according to an embodiment of the present invention.

FIG. 8 is a simplified flow diagram illustrating a method of removing particles from a volume of air through the thermal solar system according to an embodiment of the present invention. This diagram is merely an example, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

As shown in FIG. 8, the present method can be briefly outlined below.
1. Start;
2. Initiate drive device to begin flow through an entrance of a thermal solar system;
3. Transfer a volume of air through a plenum, the volume of air including a plurality of particles having a first particle concentration;
4. Maintain a flow rate associated with the volume of air at a linear velocity as the volume of air traverses through the plenum;
5. Transfer thermal energy to the volume of air to heat the air;
6. Remove one or more of the plurality of particles from the volume of air using one or more portions of the plenum to reduce the first particle concentration to a second particles concentration, the second particle concentration being less than the first particle concentration;
7. Transfer the volume of heated air having the second particle concentration through an exit of the thermal solar system;
8. Use the volume of air heated air in one or more building applications;
9. Perform other steps, as desired; and
10. Stop.

These steps are merely examples and should not unduly limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

As shown in FIG. 8, the method 800 begins at start, step 802. The present method provides an air filtration method for reducing particle concentration of a volume of air entering through the plenum of the thermal solar system. Filtering the air is essential for allowing clean air to travel into internal spaces within the target location of the thermal solar system implementation. Providing a method to reduce the particle concentration of the volume of air entering through the plenum provides consumer confidence by ensuring that the air flow used to transfer thermal energy is not also carrying in harmful particles. Here, the method begins at a thermal solar system implemented at a target location, such as the one noted above, as well as others.

A drive device is first initiated to start the air flow through the underside opening of the thermal solar system, step 804. In a specific embodiment, air can be drawn through a plurality of channels within the air plenum with the use of the drive device. The drive device draws in air from outside of the target location through the air plenum to be processed and used for various applications. In a preferred embodiment, the drive device is spatially disposed within the fluid drive region. In a specific embodiment, the drive device includes an electric motor with high temperature windings, which can withstand about 165 Degrees F. In a specific embodiment, the drive device is operable at a range from about 400 RPM to 4000 RPM, but can be others. In a preferred embodiment, the blower device comprises a fan device having a centrifugal configuration operably coupled to the drive device. Such blower device includes a plurality of blades, which are configured to move high volumes of fluid and in particular air through the plenum.

The drive device allows the transfer of a volume of air through a plenum, step 806. The volume of air can include a plurality of particles having a first particle concentration. The particles can include dust, pollen, airborne particles of comparable size, and the like. Also, the plurality of particles can include a particle size ranging from about 0.1 micron to about 400 microns. In a specific embodiment, the plenum has one or more intake regions and one or more exhaust regions. The intake region and the exhaust region can be configured in an angled orientation relative to gravity. Also, the intake region can have a first height relative to a ground and the exhaust region can have a second height relative to a ground, the first height being less than the second height. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array. Of course, there can be other variations, modifications, and alternatives.

A flow rate associated with the volume of the air is maintained at a linear velocity of less than about 1 foot to 3 feet per second as the volume of air traverses through the plenum, step 808. In a specific embodiment, the flow rate can be maintained by an air moving device including a drive device coupled to a blower device. As the air flow rate is maintained, thermal energy is transferred from the thermal solar system to the volume of air passing through the system, step 810. In a specific embodiment, the transfer of thermal energy is used to cool the solar modules to maintain optimal functionality and operating temperature. Of course, there can be other variations, modifications, and alternatives.

While thermal energy is being transferred to the volume of air, one or more of the plurality of particles from the volume is removed using one or more portions of the plenum, step 812. Through the particle removal process, the first particle concentration is reduced to a second particle concentration, the second particle concentration being less than the first particle concentration. In a specific embodiment, the removal of the one or more particles includes subjecting the one or more particles to a gravitational force, in which the particles have a size greater than about 5 microns. In another specific embodiment, the removal of the one or more particles includes subjecting the one or more particles to a "turbophoresis"-inducing flow characteristic. Because particles have more mass than air molecules, abrupt changes in air velocity (such as those observed in the presence of turbulent flow) tend to cause particles motion to deviate from the air motion due to inertial effects. These inertial effects tend to move particles from regions of high turbulence to regions of low turbulence; this process has come to be called turbophoresis. In yet another specific embodiment, the removal or the one or more particles includes subjecting the one or more particles to be impacted to one or more portions of the plenum.

Once the air has been filtered, the volume of heated air having the second particle concentration is transferred through an exit of the thermal solar system, step 814. In a specific embodiment, the exit of the thermal solar system can be one or many of the exhaust regions configured within the air plenum. The heated air can then be used in one or more building applications, step 816. In a specific embodiment, heated air can be directed into a vent or air circulation system of the target location as part of its ability to heat air in the channel. Useful purposes can include heating the air for another closed environment or system (e.g. for a house), and circulating air from the closed environment or system underneath the solar modules. Of course, there can be other variations, modifications, and alternatives.

After step 816, additional steps may be performed depending on the desired end product. These steps are merely examples and should not limit the scope of the claims herein. For example, various steps outlined above may be added, removed, modified, rearranged, repeated, and/or overlapped, as contemplated within the scope of the invention. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for filtering air for use in a building structure, the method comprising:

transferring a volume of air through a plenum characterized by an aspect ratio of at least 5:1 and having a length of greater than 100 inches, the volume of air comprising a plurality of particles having a first particle concentration;

maintaining a flow rate associated with the volume of air at a linear velocity of less than about 3 feet per second as the volume of air traverses through the plenum; and removing one or more of the plurality of particles from the volume of air using one or more portions of the plenum to reduce the first particle concentration to a second particle concentration, the second particle concentration being less than the first particle concentration.

2. The method of claim 1 wherein the plurality of particles comprise a particle size ranging from about 0.1 micron to about 400 microns.

3. The method of claim 1 wherein the plenum comprises an intake region and an exhaust region, the intake region and the exhaust region configured in an angled orientation relative to a direction of gravity.

4. The method of claim 1 wherein the plenum comprises an intake region and an exhaust region, the intake region having a first height relative to a ground and the exhaust region having a second height relative to the ground, the first height being less than the second height.

5. The method of claim 1 wherein the aspect ratio of the plenum L/W is greater than 5.

6. The method of claim 1 wherein the aspect ratio of the plenum L/W is greater than 10.

7. The method of claim 1 wherein the aspect ratio of the plenum L/W is greater than 15.

8. The method of claim 1 wherein the volume of air is characterized by a flow rate of about 500 CFM and less.

9. The method of claim 1 wherein the plenum comprises a metal material.

10. The method of claim 1 wherein the plenum comprises a polymer material.

11. The method of claim 1 wherein the removing of the one or more particles comprises subjecting the one or more particles to a gravitational force, the one or more particles having a size of greater than about 5 micron.

12. The method of claim 1 wherein the removing of the one or more particles comprises subjecting the one or more particles to a turbophoresis-inducing flow characteristic.

13. The method of claim 1 wherein the removing of the one or more particles comprises subjecting the one or more particles to be impacted to one or more portions of the plenum.

14. The method of claim 1 wherein the removing of the one or more particles comprises subjecting the one or more particles to a drag force induced by the volume of air.

15. The method of claim 1 wherein the plenum comprises a lower region, the lower region comprising one or more patterns configured to remove the one or more particles.

16. The method of claim 12 wherein the plenum comprises a lower region, the lower region comprising one or more patterns configured to increase the turbophoresis-inducing flow characteristic.

17. The method of claim 13 wherein the plenum comprises a lower region, the lower region comprising one or more patterns configured to increase the probability of particle impact on one or more portions of the plenum.

18. The method of claim 14 wherein the plenum comprises a lower region, the lower region comprising one or more patterns configured to increase the drag force induced by the volume of air on the particle.

* * * * *